United States Patent [19]
Glass

[11] Patent Number: 5,260,680
[45] Date of Patent: Nov. 9, 1993

[54] DIGITAL COMPARATOR CIRCUIT

[75] Inventor: Kevin W. Glass, San Jose, Calif.

[73] Assignee: MOS Electronics Corp., Sunnyvale, Calif.

[21] Appl. No.: 835,167

[22] Filed: Feb. 13, 1992

[51] Int. Cl.$^5$ ............................ G05B 1/03; G06F 7/02
[52] U.S. Cl. .................................. 340/146.2; 307/360
[58] Field of Search ..................... 340/146.2; 307/350, 307/360, 463; 364/715.06

[56] References Cited

U.S. PATENT DOCUMENTS

| | | | |
|---|---|---|---|
| 3,845,465 | 10/1974 | Hosick et al. | 340/146.2 |
| 4,097,844 | 6/1978 | Moyer | 340/146.2 |
| 4,797,650 | 1/1989 | Pickett | 340/146.2 |
| 4,903,005 | 2/1990 | Sakashita et al. | 340/146.2 |

OTHER PUBLICATIONS

Huey Ling, "High-Speed Binary Adder", IBJ. J. Res. Develop., vol. 25, No. 3, May 1981, pp. 157-166.

Leo C. M. Pfennings, et al., "Differential Split-Level CMOS Logic for Subnanosecond Speeds", IEEE Journal of Solid-State Circuits, vol. SC-20, No. 5, Oct. 1985, pp. 1050-1055.

Shih-Lien Lu, "Implementation of Iterative Networks with CMOS Differential Logic", IEEE Journal of Solid-State Circuits, vol. 23, No. 4, Aug. 1988, pp. 1013-1017.

Masakazu Shoh, "FET Scaling in Domino CMOS Gates", IEEE Journal of Solid-State Circuits, vol. SC-20, No. 5, Oct. 1985, pp. 1067-1071.

Mark G. Johnson, "A Symmetric CMOS NOR Gate for High-Speed Applications", IEEE Journal of Solid-State Circuits, vol. 23, No. 5, Oct. 1988, pp. 1233-1236.

"Pipelined Carry-Lookahead Adder for Fixed-Point Arithmetic", IBM Technical Disclosure Bulletin, vol. 28, No. 9, Feb. 1986, pp. 4106-4108.

W. R. Griffin et al., "CMOS Four-Way XOR Circuit", IBM Technical Disclosure Bulletin, vol. 25, No. 11B, Apr. 1983, pp. 6066-6067.

V. Friedman et al., "Dynamic Logic CMOS Circuits", IEEE Journal of Solid-State Circuits, vol. SC-19, No. 2, Apr. 1984, pp. 263-266.

Richard P. Brent, "A Regular Layout for Parallel Adders", IEEE Transactions on Computers, vol. C-31, No. 3, Mar. 1982, pp. 260-264.

Nelson F. Goncalves et al., "NORA: A Racefree Dynamic CMOS Technique for Pipelined Logic Structures", IEEE Journal of Solid-State Circuits, vol. SC-18, No. 3, Jun. 1983, pp. 261-266.

J. Sklansky, "Conditional-Sum Addition Logic", IRE Transactions on Electronic Computers, Jun. 1960, pp. 226-230.

Damu Radhakrishnan, et al., "Formal Design Procedures for Pass Transistor Switching Circuits", IEEE Journal of Solid-State Circuits, vol. SC-20, No. 2, Apr. 1985, pp. 531-536.

Alan D. Berenbaum et al., "CRISP: A Pipelined 32-bit Microprocessor with 13-kbit of Cache Memory", IEEE Journal of Solid-State Circuits, vol. SC-22, No. 5, Oct. 1987, pp. 776-782.

Shigeo Kuninobu et al., "Design of High Speed MOS Multiplier and Divide: Using Redundant Binary Representation", 1987 IEEE, pp. 80-86.

Inseok S. Hwang, et al., "A 3.1 ns 32b CMOS Adder in Multiple Output Domino Logic", IEEE International Solid-State Circuit Conference, Feb. 18, 1988, pp. 140-141.

(List continued on next page.)

Primary Examiner—John Zazworsky
Attorney, Agent, or Firm—Skjerven, Morrill, McPherson, Franklin & Friel

[57] ABSTRACT

A comparator circuit is provided that determines whether a given value is within a selected compare range. The comparator circuit electronically implements a Ling Adder algorithm to perform comparisons. The circuit operates at a high speed and requires fewer components compared to circuitry implementing a conventional carry look ahead algorithm. The circuit may be implemented in CMOS technology.

22 Claims, 6 Drawing Sheets

OTHER PUBLICATIONS

Kan M. Chu et al., "A Comparison of CMOS Circuit Techniques: Differential Cascode Voltage Switch Logic Versus Conventional Logic", IEEE Journal of Solid-State Circuits, vol. SC-22, No. 4, Aug. 1987, pp. 528-532.

Vojin G. Oklobdzija et al., "Some Optimal Schemes for ALU Implementation in VLSI Technology", 1985 IEEE, pp. 2-8.

Timothy A. Grotjohn, "Sample-Set Differential Logic (SSDL) for Complex High-Speed VLSI", IEEE Journal of Solid-State Circuits, vol. SC-12, No. 2, Apr. 1986, pp. 367-369.

Vojin G. Oklobdzija et al., "Design-Performance Trade-Offs in CMOS Domino Logic", IEEE Journal of Solid-State Circuits, vol. SC-21, No. 2, Apr. 1986, pp. 304-309.

R. H. Krambeck, "High-Speed Compact Circuits with CMOS", IEEE Journal of Solid-State Circuits, vol. SC-17, No. 3, Jun. 1982, pp. 614-619.

David J. Myers et al., "A Design Style for VLSI CMOS", IEEE Journal of Solid-State Circuits, vol. SC-20, No. 3, Jun. 1985, pp. 741-745.

Gary Bewick et al., "Approaching a Nanosecond: A 32 bit Adder", Computer Systems Laboratory, Stanford University, pp. 1-8.

Lawrence G. Heller et al., "Cascode Voltage Switch Logic: A Differential CMOS Logic Family", 1984 IEEE International Solid-State Circuits Conference, Feb. 1984, pp. 16-17.

Jacobus A. Pretorius, et al., "Latched Domino CMOS Logic", IEEE Journal of Solid-State Circuits, vol. SC-21, No. 4, Aug. 1986, pp. 514-522.

Kan M. Chu, et al., "Design Procedures for Differential Cascode Voltage Switch Circuits", IEEE Journal of Solid-State Circuits, vol. SC-21, No. 6, Dec. 1986, pp. 1081-1087.

5,260,680

DIGITAL COMPARATOR CIRCUIT

BACKGROUND OF THE INVENTION

1. Field of the Invention

This invention relates to comparator circuitry and more particularly to high speed digital comparator circuitry to determine whether a given binary value is within a selected range. The invention further relates to comparator circuitry used within cache memory systems.

2. Description of the Relevant Art

Comparator circuitry is widely used to perform particular functions within electrical systems. In some applications, comparator circuitry is used to determine whether a given value is within a selected compare range of values. A carry look-ahead algorithm is typically implemented to provide the comparison operation. In such applications, a pair of subtractors and a pair of equality detect circuits are used to perform the comparison for both the upper limit and the lower limit of the compare range. The inverted borrow output signals from each of the subtractors and the output signals from the two equality detect circuits are then logically ANDed to generate an output signal that indicates whether the given value is within the selected compare range.

A comparator circuit may be used, for example, within cache memory systems. Within such a system, the comparator circuit determines whether a received address corresponds to a non-cacheable memory location. For example, memory locations corresponding to input/output devices are typically non-cacheable. If the address is within the selected range, the comparator circuitry must generate a signal to prevent the activation of the cache memory. As a result of the increased speed of digital systems, the comparator circuitry must generate its output signal with very little delay.

It is therefore desirable to provide comparator circuitry that determines whether a given value is within a selected range and that operates with little delay to accommodate high speed operation of cache memory systems.

SUMMARY OF THE INVENTION

In accordance with the present invention, a comparator circuit is provided that determines whether a given value is within a selected compare range. The comparator circuit electronically implements a Ling-Adder algorithm to perform comparisons. The circuit operates at a high speed and requires fewer components compared to circuitry implementing a conventional carry look-ahead algorithm. The circuit in accordance with the present invention may be implemented in CMOS technology.

These and other advantages are achieved by the present invention, in accordance with which a digital comparator circuit is provided for determining whether a binary value of a given signal is within a range determined by a binary value of a lower limit signal and a binary value of an upper limit signal. The comparator circuit comprises a plurality of first-level synthetic generate circuits each coupled to receive selected bits of the given signal and each generating a first-level synthetic generate signal. A plurality of first-level synthetic propagate circuits are also provided which are coupled to receive selected bits of the given signal and to generate a first-level synthetic propagate signal. A second-level synthetic generate and output circuit is coupled to each of the first-level synthetic generate circuits and to each of the first-level synthetic propagate circuits. The second-level synthetic generate and output circuit includes a first means for generating a second-level synthetic generate signal corresponding to the upper limit signal and a second means for generating a second-level synthetic generate signal corresponding to the lower limit signal. The second level synthetic generate and output circuit further comprises a comparison result output line coupled to the first means for generating a second-level synthetic generate signal and to the second means for generating a second-level synthetic generate signal. The comparison result output line provides a comparison result output signal indicative of whether the binary value of the given signal is within the range.

In accordance with a further aspect of the invention, the second-level synthetic generate and output circuit further comprises a first transistor and a second transistor connected in series with the first transistor between the comparison result output line and ground.

In accordance with yet another aspect of the invention, the first means for generating a second-level synthethic generate signal comprises a first set of transistors connected in series with respect to each other between the comparison result output line and a ground terminal. Each transistor within the first set of transistors includes a gate terminal coupled to receive one of the first-level synthetic generate signals generated by one of the plurality of first-level synthetic generate circuits. The first means further comprises a second set of transistors each coupled between a node connecting the first set of transistors and ground. Each transistor of the second set of transistors includes a gate terminal coupled to receive one of the first-level synthetic propagate signals generated by one of the plurality of first-level synthetic propagate circuits.

The invention will be more readily understood by reference to the drawings and the detailed description. As will be appreciated by one skilled in the art, the invention is applicable to comparator circuits in general, and is not limited to the specific embodiment disclosed.

DETAILED DESCRIPTION

The following includes a detailed description of the best presently contemplated mode for carrying out the invention. The invention is intended to be merely illustrative of the invention and should not be taken in a limiting sense.

FIGS. 1A-5 show block and schematic diagrams of a comparator circuit in accordance with the present invention. The embodiment of the comparator circuit shown is implemented within a cache memory system. It will be appreciated by one skilled in the art from the description below that the comparator circuit may be used within a variety of other applications.

Figure 1A:
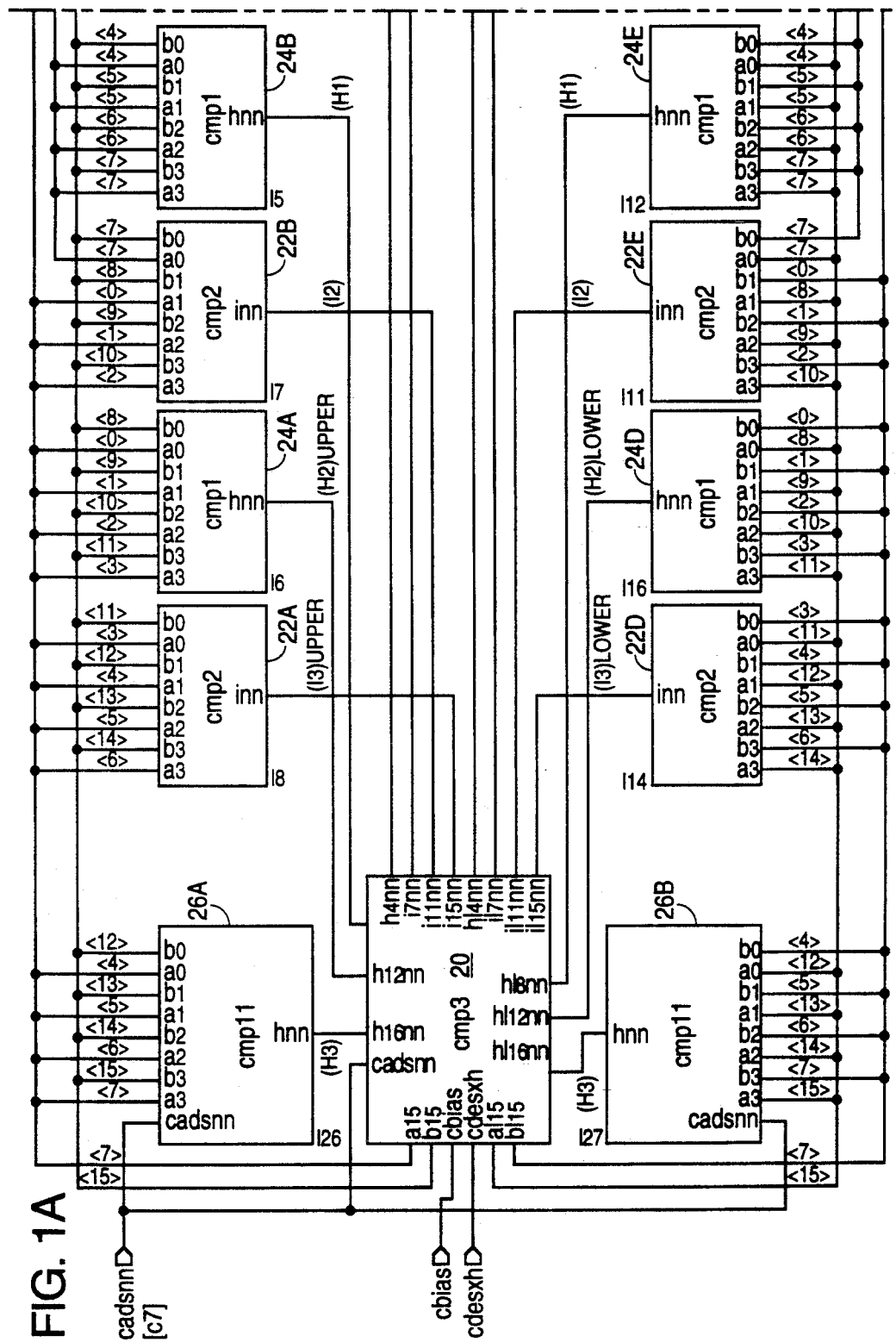
FIGS. 1A and 1B are a block diagram of a comparator circuit in accordance with the present invention.
Figure 1B:
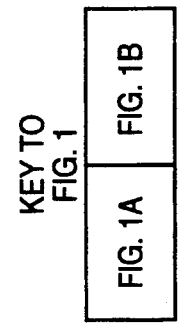
Figure 1B:
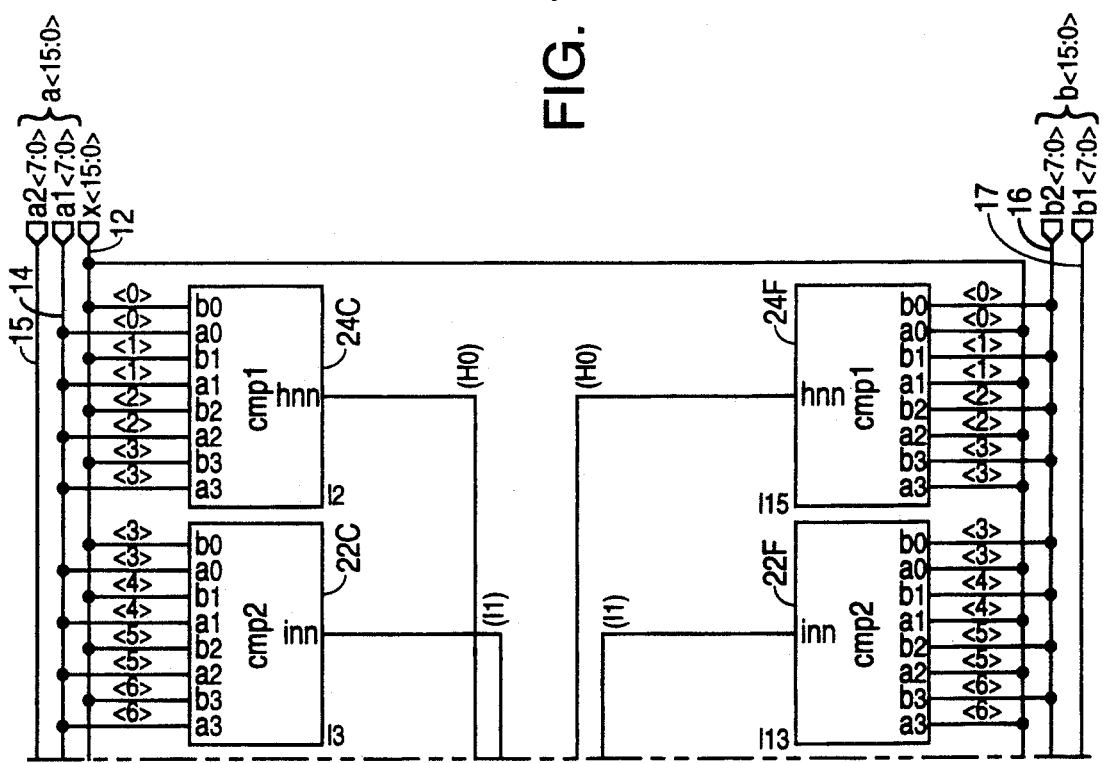

In general, the comparator circuit of FIG. 1 is configured to determine whether a 16-bit addressing signal labelled x<15:0> at bus 12 is within a selected range. The addressing signal x<15:0> is received from a microprocessor (not shown). The selected range is determined at its upper limit by signals labelled a1<7:0> and a2<7:0> at busses 14 and 15, and is determined at its lower limit by signals labelled b1<7:0> and b2<7:0> at busses 16 and 17. Signals a1<7:0> and a2<7:0> are collectively referred to as signal a<15:0>. Signals b1<7:0> and b2<7:0> are collectively referred to as signal b<15:0>.

In mathematical notation, therefore, the comparator circuit determines whether equation (1) as given below is satisfied:

$$b \leq x \leq a \tag{1}$$

The validity of equation (1) can be determined by subtracting the given address x from the lower limit b, and by subtracting the upper limit a from the given address x. The borrow bits from the results of these subtraction operations are then logically ANDed to determine whether the given address x is within the selected range. These operations are represented by equations (2)-(4) below:

$$borrow1 = b - x \tag{2}$$

$$borrow2 = x - a \tag{3}$$

$$\text{In Range} = borrow1 * borrow2 \tag{4}$$

To implement the subtraction operations given by equations (2) and (3) within the preferred embodiment of the comparator circuit, the Ling-Adder algorithm is employed. The theory of the Ling-Adder algorithm is explained in more detail within the article "High-Speed Binary Adder," by Huey Ling, *IBM J.Res.Develop.*, Vol. 25, No. 3, May 1981, pp. 157-166. This document is incorporated herein by reference in its entirety.

The fundamental equations necessary to determine the borrow output of a subtraction operation $M + (-N)$ in accordance with the Ling-Adder algorithm are next explained. Since the preferred embodiment of the invention is implemented for a 16-bit addressing system, the following equations are tailored for a 16-bit wide subtraction operation. It will be evident that the present invention may be applied to comparator environments having any bit-width.

To determine whether a borrow output results for a subtraction operation M-N in a 16-bit- comparison, the first level synthetic generate terms H0-H3 as given by logic equations (5)-(8) must be determined:

$$H0 = G3 + G2 + P2 * G1 + P2 * P1 * G0 \tag{5}$$

$$H1 = G7 + G6 + P6 * G5 + P6 * P5 * G4 \tag{6}$$

$$H2 = G11 + G10 + P10 * G9 + P10 * P9 * G8 \tag{7}$$

$$H3 = G15 + G14 + P14 * G13 + P14 * P13 * G12 \tag{8}$$

where
$P(i) = M(i) + (-N(i))$
$G(i) = M(i) * (-N(i))$
$(i) = 0, 1, 2 \ldots 15$ (bit position)

The synthetic propagate terms I1-I3 of the Ling-Adder algorithm must also be determined. The synthetic propagate terms are given by equations (9)-(11) as:

$$I1 = P6 * P5 * P4 * P3 \tag{9}$$

$$I2 = P10 * P9 * P8 * P7 \tag{10}$$

$$I3 = P14 * P13 * P12 * P11 \tag{11}$$

After generating the synthetic generate terms H0-H3 and the synthetic propagate terms I1-I3, the second level synthetic generate term H, must be determined as given in equation (12):

$$H' = H3 + I3*H2 + I3*I2*H1 + I3*I2*I1*H0 \tag{12}$$

The borrow output of the subtraction operation $M + (-N)$ can then be determined in accordance with equation (13):

$$C = P15 * H' \tag{13}$$

As discussed previously, to determine whether a given address x is within a selected range as given by equation (1), the borrow outputs for the subtraction operations given by equations (2) and (3) must be determined, and must be logically ANDed as indicated in equation (4). The result of the logical AND operation of equation (4) indicates whether the given address x is within the selected range.

Referring again to FIGS. 1A and 1B, the comparator circuit includes a second-level synthetic generate and output circuit 20, six first-level synthetic propagate circuits 22A-22F, six first-level synthetic generate circuits 24A-24F, and two first-level synthetic generate circuits 26A and 26B with power-down logic. Each of the first-level synthetic propagate circuits 22A-22F, as well as each of the first-level synthetic generate circuits 24A-24F, are identical. Similarly, both first-level synthetic generate circuits 26A and 26B with power-down logic are identical.

As will be better understood from the description below, the second-level synthetic generate and output circuit 20 generates the second level synthetic generate terms H' in accordance with equation (12) for both the lower limit subtraction operation (equation (2)) and the upper limit subtraction operation (equation (3)). The second-level synthetic generate and output circuit 20 further generates the borrow output bit C in accordance with equation (13) for both the lower and upper limit subtraction operations. The second-level synthetic generate and output circuit 20 is finally configured to provide an output signal indicative of whether the selected address x is within the compare range limits a and b.

The first-level synthetic propagate circuits 22A-22C generate the synthetic propagate terms I3, I2, and I1, respectively, for the upper limit subtraction operation (equation 3)). Similarly, the first-level synthetic propagate circuits 22D-22F generate the synthetic propagate terms I3, I2, and I1, respectively, for the lower limit subtraction operation (equation (2)). The first-level synthetic generate circuits 24A-24C generate the synthetic generate terms H2, H1, and H0, respectively, for the upper limit subtraction operation, and the first-level synthetic generate circuits 24D-24F generate the synthetic generate terms H2, H1, and H0, respectively, for the lower limit subtraction operation. Finally, the synthetic generate circuits 26A and 26B with power-down logic generate the synthetic generate term H3 for the upper and lower limit subtraction operations, respectively. The first-level synthetic generate circuits 26A and 26B with power-down logic also include circuitry to minimize power consumption. These circuits will be better understood in view of the following description.

Figure 2:
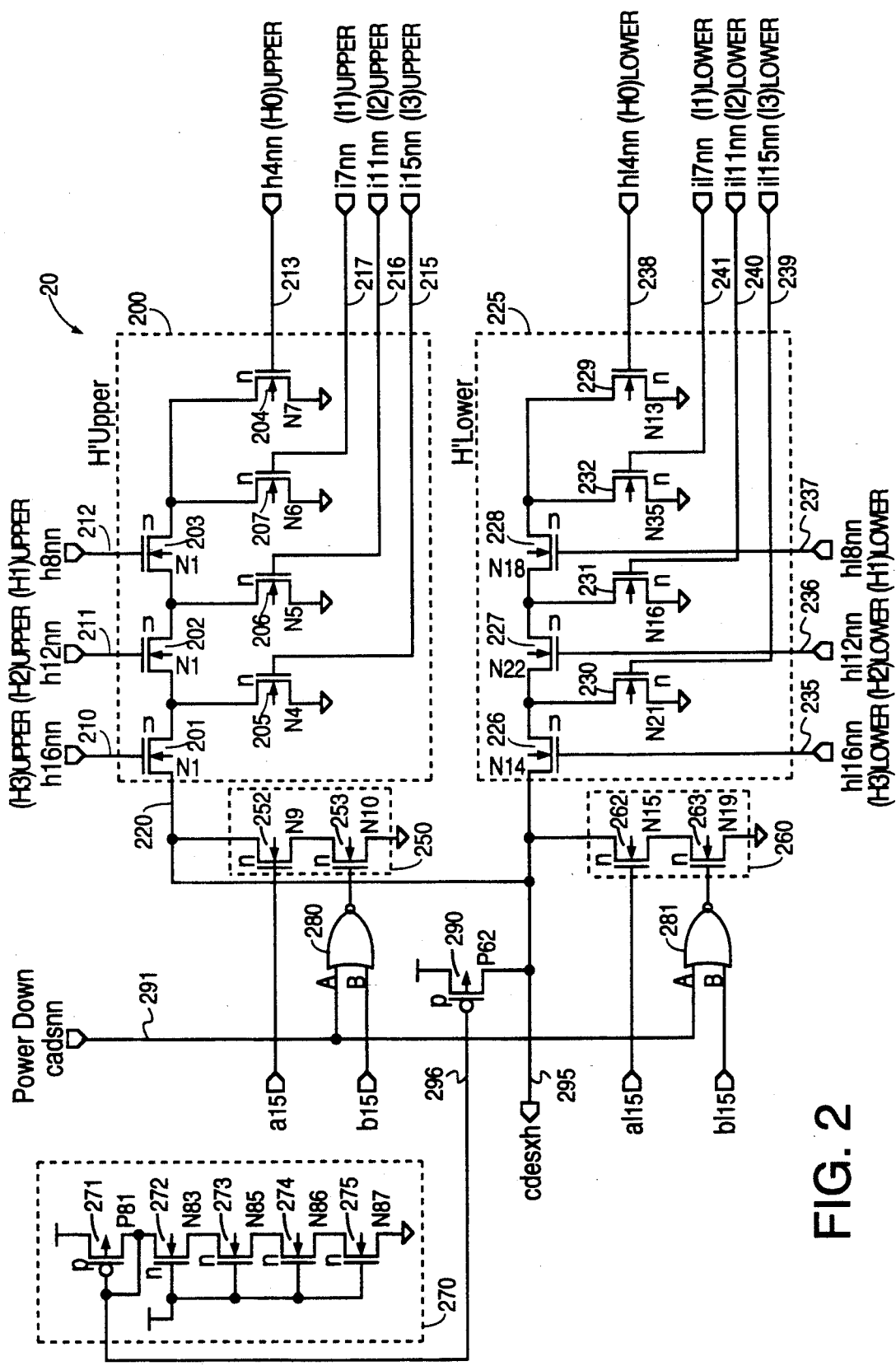
FIG. 2 is a schematic diagram of a second-level synthetic generate circuit incorporated within the comparator.

Referring next to FIG. 2, a schematic diagram of the second-level synthetic generate and output circuit 20 is shown. The circuit 20 includes a section 200 that generates the second-level propagate term H, for the upper limit subtraction operation (equation (3)) and a section 225 that generates the second-level synthetic generate term H' for the lower limit subtraction operation (equation (2)). The circuit 20 further includes a section 250 for generating the P15 term for the upper limit subtraction operation and a section 260 for generating the P15 term for the lower limit subtraction operation. The circuit 20 finally includes a bias circuit 270, NOR gates 280 and 281, and P-channel field effect transistor 290.

Section 200 includes N-channel field effect transistors 201–207. The first-level synthetic generate terms H3–H0 for the upper limit are received at lines 210–213, respectively. Similarly, the first-level synthetic propagate terms I3–I1 for the upper limit are received at lines 215–217, respectively. The circuits for generating the H0–H3 and I1–I3 terms will be explained in more detail below.

It is noted that field effect transistors 201–204 are connected in series with respect to one another via their source and drain terminals between ground and an output line 220. The first-level synthetic generate terms H3–H0 are provided to the gate terminals of transistors 201–204. Each of transistors 205–207 is connected between a node that connects a separate pair of the series transistors 201–204 and ground. The first-level synthetic propagate terms I3–I1 are provided to the gate terminals of transistors 205–207.

Section 225 includes N-channel field effect transistors 226–232 and is configured similar to section 200. The sections 200 and 225 generate the terms H' as represented in equation (12) for the upper and lower limit subtraction operations, respectively. Output signals indicative of the logical results of the H' terms are provided at output lines 220 and 245.

During operation, the synthetic generate terms H0–H3 and the synthetic propagate terms I1–I3 for the upper limit and lower limit subtraction operations are received at lines 210–217 and lines 235–241. The second level synthetic generate term H' for the upper limit subtraction operation is consequently generated by the circuitry within section 200. At the same time, the second level synthetic generate term H' for the lower limit subtraction operation is generated by the circuitry within section 225.

Output line 220 is connected to section 250. Section 250 includes a pair of N-channel field effect transistors 252 and 253 connected in series between output line 220 and ground. Section 250 causes a logical AND function to operate on the most significant bit (i.e. bit <15>) of the addressing signal x<15:0> and the most significant bit (i.e., bit <15>) of the upper limit signal a<15:0>. Section 250 thereby generates the term P15 as given in equation (13) for the upper limit subtraction operation. Since transistor 252 is connected to line 220 to thereby form a "wired-OR" gate, the borrow term C of equation (13) is generated at line 220.

Section 260 includes a pair of N-channel field effect transistors 262 and 263 and is configured similar to section 250. Section 260 causes a logical AND function to operate on the most significant bit (i.e., bit <15>) of the addressing signal x<15:0> and the most significant bit (i.e., bit <15>) of the lower limit signal b<15:0>. A compare output line 295 is directly connected to lines 220 and 245 to thereby form a "wired-OR" gate. By connecting these lines, the logical AND operation of equation (4) is implemented.

It is noted that since the logical AND operations given by equations (4) and (13) are implemented by directly connecting lines 220, 245, and 295, additional gate delay is not introduced. Thus, the compare operation is performed with minimal delay.

A reference voltage is generated by bias circuit 270 and is provided at line 296. Bias circuit 270 includes P-channel field effect transistor 271 and N-channel field effect transistors 272-275. Transistor 290 is a current source and is used to pull up the output node voltage. In NMOS technology, a depletion device could be substituted in place of transistor 290 and the reference voltage circuit.

Figure 3:
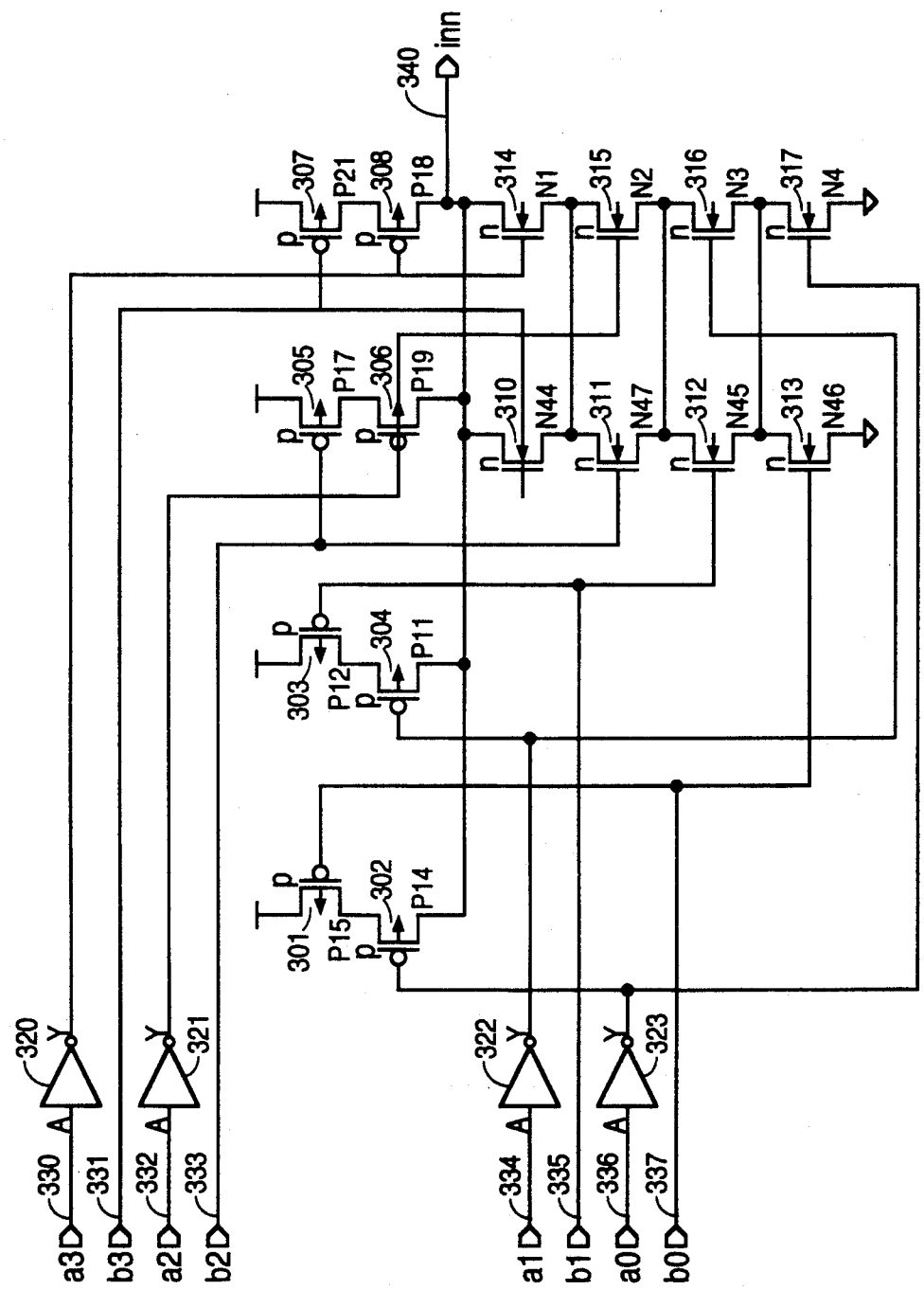
FIG. 3 is a schematic design of a first-level synthetic propagate circuit incorporated within the comparator.

When a comparison operation is not being performed, a power down signal is asserted high at line 291. The output signal of NOR gates 280 and 281 are thereby held low. Consequently, transistors 253 and 263 remain off and prevent the flow of current from transistor 290 through sections 250 and 260. As will be evident from the following description, transistors 201 and 226 are also held off during the power down mode to prevent current flow through sections 200 and 225. As a result, power consumption is minimized. 5 The circuitry for generating the first-level synthetic generate terms H0–H3 and the first-level synthetic propagate terms I1–I3 is next considered. Referring to FIG. 3, a schematic diagram is shown that is representative of each of the synthetic propagate circuits 22A–22F. The circuit includes P-channel field effect transistors 301–308 and N-channel field effect transistors 310–317. The circuit further includes inverters 320–323.

Transistors 310–313 and transistors 314–317 are connected in series between an I-term output line 340 and ground. It is evident (referring back to FIG. 1) that each of the circuits 22A–22F receives a different combination of input signals at input lines 330–337. Depending upon the position of the specific circuit 22A–22F, each of the gates of the series transistors 310–313 are connected to receive a separate bit of either the addressing signal x<15:0> or of the limit signals a<15:0> and b<15:0>. Similarly, each of the gates of the series transistors 314–317 are connected to receive a separate inverted bit of either the addressing signal x<15:0> or the limit signals a<15:0> and b<15:0>. Each transistor pairs 301–302, 303–304, 305–306, and 307–308 is connected in series between a voltage supply terminal and output line 340. The gate of one of the transistors in each series transistor-pair is connected to receive a separate bit of either the addressing signal x<15:0> or of the limit signals a<15:0> and b<15:0>. The gate of the other transistor in each series transistor-pair is connected to receive an inverted same-order bit of the corresponding addressing signal x<15:0> or limit signals a<15:0> and b<15:0>.

For example, referring to FIGS. 1A, 1B, and 3, circuit 22C generates the synthetic propagate term I0 for the upper subtraction operation given by equation (3). For this circuit, the corresponding line 337 of FIG. 3 receives bit <0> of the addressing signal x<15:0> and the corresponding line 336 receives bit <0> of the upper limit signal a<15:0>. Similarly, the corresponding lines 330, 222, and 334 receive bit<3>, bit<2>, and bit <1>, respectively, of the upper limit signal a<15:0>. Lines 331, 333, and 335 receive bit<3>, bit<2>, and bit<1>, respectively, of the addressing signal x<15:0>. Since the upper limit subtraction operation as indicated in equation (3) involves subtracting the upper limit signal a<15:0> from the addressing signal x<15:0>, lines 330, 332, 334, and 336, to which the upper limit signal bits <3:0> are provided, are connected to inverters 320–323.

During operation, the corresponding addressing signals x<15:0> and the corresponding upper or lower limit signals a<15:0> or b<15:0> are received at lines 330–337. Inverters S20-323 are connected to lines 330–332, 334 and 336 to thereby negate the associated bits to implement a subtraction operation rather than an addition operation. Transistors 301–317 are configured such that the logical operations given by equations (9)–(11) are implemented for the corresponding input signal combinations.

Figure 4:
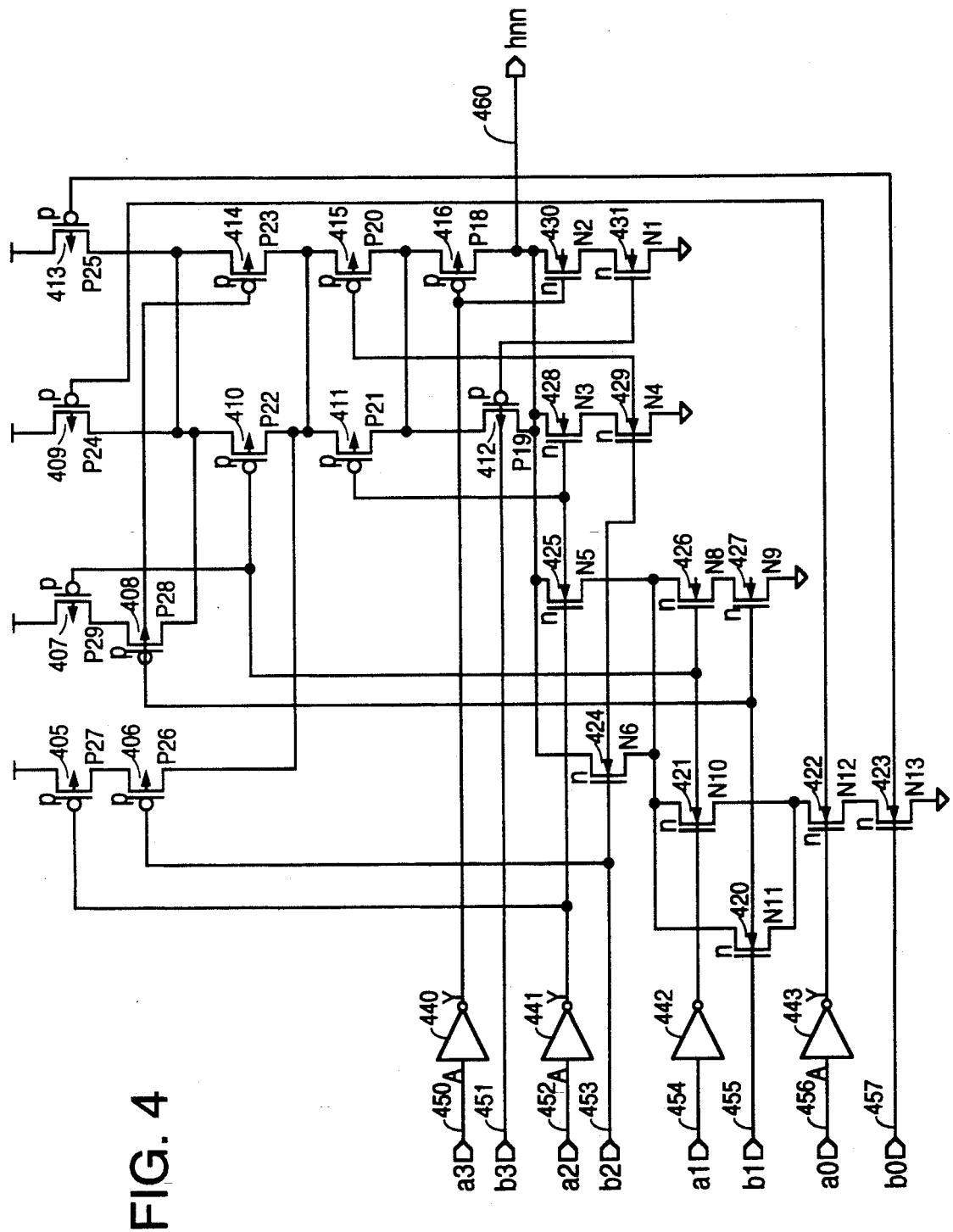
FIG. 4 is a schematic design of a first-level synthetic generate circuit incorporated within the comparator.

Referring next to FIG. 4, a schematic diagram is shown that is representative of each of the first-level synthetic generate circuits 24A–24F. The circuit includes P-channel field effect transistors 405–416 and N-channel field effect transistors 420–431. The circuit further includes inverters 440–443.

During operation, the corresponding bits of the addressing signal x<15:0> and the corresponding bits of either signal a<15:0> or signal b<15:0> are received at input lines 450–457. Inverters 440–443 are incorporated to negate the associated bits at input lines 450, 452, 454, and 456 to thereby implement a subtraction operation. Transistors 405–416 and 420–431 are configured such that a logical operation corresponding to equations (5)–(7) are implemented. An output signal indicative of the result of the logical operation is generated at output line 460.

Figure 5:
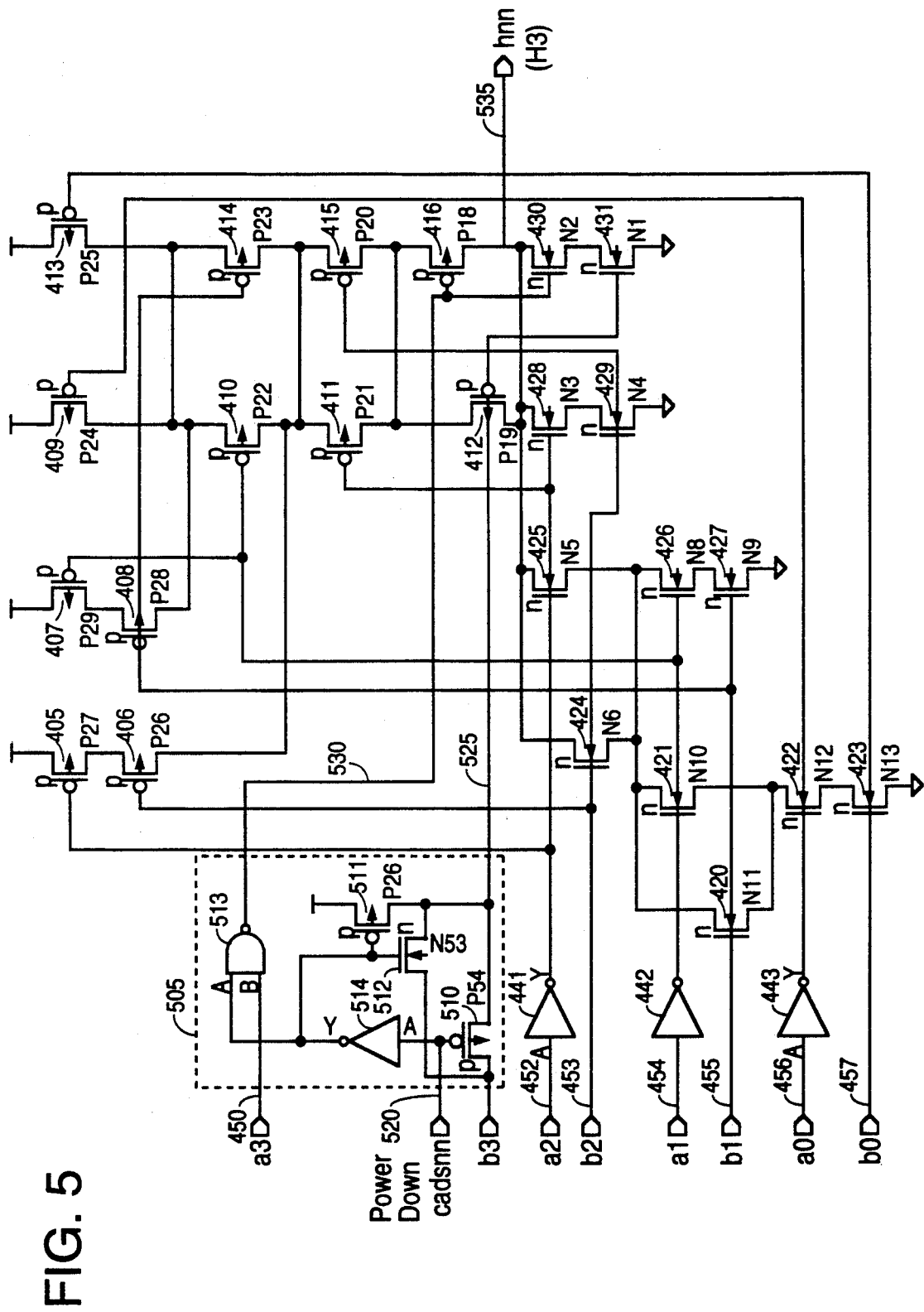
FIG. 5 is a schematic design of a first-level synthetic generate circuit with power-down logic incorporated within the comparator.

The circuit of FIG. 5 is identical to the circuit of FIG. 4 but also includes a power down logic circuit 505. Corresponding circuit elements are numbered identically in FIGS. 4 and 5.

The power down logic circuit 505 of FIG. 5 includes P-channel field effect transistors 510 and 511, an N-channel field effect transistor 512, an NAND gate 513, and an inverter 514. During normal operation when the power down signal is low, the power down logic circuit 505 is not activated, and consequently the circuit generates the synthetic term H3 as given by equation (8).

When the power down signal at line 520 is high, transistors 510 and 512 are turned off. Therefore, the signal at line 525 is high. In addition, since input A of NAND gate 513 is low, line 530 is also high. Therefore, the voltage level at the output line 535 is forced to zero thereby overriding all other logic inputs, i.e. each of the signals at lines 450–457. Referring back to FIG. 2, since transistors 201 and 226 remain off during the power down mode, current cannot flow through sections 200 and 225 regardless of the remaining terms H0–H2 and I1–I3 of the upper and lower limit subtraction operations. Thus, minimal power is consumed.

In accordance with the circuit of FIGS. 1–5, the comparator circuit determines whether a given value is within a selected compare range. The comparator circuit electronically implements the Ling-Adder algorithms to perform comparisons. The circuit operates at a high speed and requires fewer components compared to circuitry implementing a conventional carry look-ahead algorithm. In addition, the circuit may be implemented using CMOS technology.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

I claim:

1. A digital comparator circuit for determining whether a binary value of a given signal is within a range determined by a binary value of a lower limit signal and a binary value of an upper limit signal; the comparator circuit comprising:

a plurality of first-level synthetic generate circuits each coupled to receive selected bits of said given signal and each generating a first-level synthetic generate signal;

a plurality of first-level synthetic propagate circuits each coupled to receive selected bits of said given signal and each generating a first-level synthetic propagate signal; and a second-level synthetic generate and output circuit coupled to each of said first-level synthetic generate circuits and to each of said first-level synthetic propagate circuits, said second-level synthetic generate and output circuit including a first means for generating a second-level synthetic generate signal corresponding to said upper limit signal and a second means for generating a second-level synthetic generate signal corresponding to said lower limit signal;

wherein said second level synthetic generate and output circuit further comprises a comparison result output line coupled to said first means for generating a second-level synthetic generate signal and to said second means for generating a second-level synthetic generate signal, and wherein said comparison result output line provides a comparison result output signal indicative of whether the binary value of said given signal is within said range.

2. The comparator circuit as recited in claim 1 wherein said second-level synthetic generate and output circuit further comprises:

a first transistor; and a second transistor connected in series with said first transistor between said comparison result output line and a reference voltage terminal.

3. The comparator circuit as recited in claim 2 wherein said first and second transistors are N-channel field effect transistors.

4. The comparator circuit as recited in claim 2 wherein said reference voltage terminal is at ground potential.

5. The comparator circuit as recited in claim 1 wherein said first means for generating a second-level synthethic generate signal comprises:

a first set of transistors connected in series with respect to each other between said comparison result output line and a ground terminal, wherein each transistor within said first set of transistors includes a gate terminal coupled to receive one of said first-level synthetic generate signals generated by one of said plurality of first-level synthetic generate circuits; and a second set of transistors each coupled between a node connecting said first set of transistors and ground, wherein each transistor of said second set of transistors includes a gate terminal coupled to receive one of said first-level synthetic propagate signals generated by one of said plurality of first-level synthetic propagate circuits.

6. The comparator circuit as recited in claim 5 wherein each transistor within said first set of transistors is an N-channel field effect transistor and wherein each transistor within said second set of transistors is an N-channel field effect transistor.

7. The comparator circuit as recited in claim 1 wherein said second means for generating a second-level synthethic generate signal comprises:

a first set of transistors connected in series with respect to each other between said comparison result output line and a ground terminal, wherein each transistor within said first set of transistors includes a gate terminal coupled to receive one of said first-level synthetic generate signals generated by one of said plurality of first-level synthetic generate circuits; and a second set of transistors each coupled between a node connecting said first set of transistors and ground, wherein each transistor of said second set of transistors includes a gate terminal coupled to receive one of said first-level synthetic propagate signals generated by one of said plurality of first-level synthetic propagate circuits.

8. The comparator circuit as recited in claim 7 wherein each transistor within said first set of transistors is an N-channel field effect transistor and wherein each transistor within said second set of transistors is an N-channel field effect transistor.

9. The comparator circuit as recited in claim 1 further comprising a current source connected to said comparison result output line, wherein said current source includes a P-channel field effect transistor connected to a supply voltage terminal and to said comparison result output line.

10. The comparator circuit as recited in claim 1 wherein each of said first-level synthetic propagate circuits includes:

a first set of transistors connected in series with respect to one another between ground and a synthetic propagate output line where said first-level synthetic propagate signal is provided; and a second set of transistors connected in series with respect to one another between a supply voltage terminal and said synthetic propagate output line.

11. The comparator circuit as recited in claim 10 wherein said second set of transistors consists of:

a first P-channel field effect transistor having a gate terminal connected to receive a selected bit of said given signal; and a second P-channel field effect transistor having a gate terminal coupled to receive a selected inverted bit of said upper limit signal.

12. A comparator circuit as recited in claim 10 wherein said second set of transistors consists of:

a first P-channel field effect transistor having a gate terminal connected to receive a selected bit of said lower limit signal; and a second P-channel field effect transistor having a gate terminal coupled to receive a selected inverted bit of said given signal.

13. The comparator circuit as recited in claim 10 wherein said first set of transistors consists of a first N-channel field effect transistor, a second N-channel field effect transistor, a third N-channel field effect transistor, and a fourth N-channel field effect transistor, each connected in series with respect to one another between said synthetic propagate output line and ground, and wherein each of said first, second, third, and fourth N-channel field effect transistors includes a gate terminal coupled to receive a selected inverted bit of said upper limit signal.

14. The comparator circuit as recited in claim 10 wherein said first set of transistors consists of a first N-channel field effect transistor, a second N-channel field effect transistor, a third N-channel field effect transistor, and a fourth N-channel field effect transistor, each connected in series with respect to one another between said synthetic propagate output line and ground, and wherein each of said first, second, third, and fourth N-channel field effect transistors includes a gate terminal coupled to receive a selected inverted bit of said given signal.

15. The comparator circuit as recited in claim 1 wherein one of said plurality of first-level synthetic generate circuits implements a logical equation:

$$H0 = G3 + G2 + P2 * G1 + P2 * P1 * G0;$$

where $$P(i) = M(i) + (-N(i));$$

$$G(i) = M(i) * (-N(i));\text{ and}$$

where
M(i) corresponds to selected bits of said lower limit signal and
N(i) corresponds to selected bits of said given signal.

16. The comparator circuit as recited in claim 15 wherein one of said plurality of first-level synthetic propagate circuits implements a logical equation given by:

$$I1 = P6 * P5 * P4 * P3$$

17. The comparator circuit as recited in claim 16 wherein said second-level synthetic generate and output circuit implements a logical function as given by:

$$H' = H3 + I3 * H2 + I3 * I2 * H1 + I3 * I2 * I1 * H0.$$

18. The comparator circuit as recited in claim 1 wherein one of said plurality of first-level synthetic generate circuits includes a power-down logic circuit.

19. The comparator circuit as recited in claim 18 wherein said power-down logic circuit comprises:

a power-down input line for receiving a power-down signal;

a NAND gate coupled to receive said power-down signal;

and at least a first transistor coupled between ground and a first-level synthetic generate output line that provides said first-level synthetic generate signal;

wherein an output line of said NAND gate is coupled to said first transistor for turning on said first transistor when said power-down signal is asserted.

20. The comparator circuit as recited in claim 18 wherein said one of said plurality of first-level synthetic generate circuits further includes at least a first transistor coupled between ground and a first-level synthetic generate output line that provides said first-level synthetic generate signal, and wherein said power-down circuit provides a signal to turn on said first transistor when a power down signal is asserted.

21. A digital comparator circuit for determining whether a binary value of a given signal is within a range determined by a binary value of a lower limit signal and a binary value of an upper limit signal; the comparator circuit comprising:
- a plurality of first-level synthetic generate circuits each coupled to receive selected bits of said given signal and each generating a first-level synthetic generate signal;
- a plurality of first-level synthetic propagate circuits each coupled to receive selected bits of said given signal and each generating a first-level synthetic propagate signal;
- a second-level synthetic generate and output circuit coupled to each of said first-level synthetic generate circuits and to each of said first-level synthetic propagate circuits, said second-level synthetic generate and output circuit including a first means for generating a second-level synthetic generate signal corresponding to said upper limit signal and a second means for generating a second-level synthetic generate signal corresponding to said lower limit signal;
- wherein said second level synthetic generate and output circuit further comprises a comparison result output line coupled to said first means for generating a second-level synthetic generate signal and to said second means for generating a second-level synthetic generate signal, and wherein said comparison result output line provides a comparison result output signal indicative of whether the binary value of said given signal is within said range;
- wherein said first means for generating a second-level synthetic generate signal includes:
- a first set of transistors connected in series with respect to each other between said comparison result output line and a ground terminal, wherein each transistor within said first set of transistors includes a gate terminal coupled to receive one of said first-level synthetic generate signals generated by one of said plurality of first-level synthetic generate circuits; and
- a second set of transistors each coupled between a node connecting said first set of transistors and ground, wherein each transistor of said second set of transistors includes a gate terminal coupled to receive one of said first-level synthetic propagate signals generated by one of said plurality of first-level synthetic propagate circuits; and
- wherein said second-level synthetic generate and output circuit further includes a first transistor and a second transistor connected in series with said first transistor between said comparison result output line and ground.

22. A digital comparator circuit for determining whether a binary value of a given signal is within a range determined by a binary value of a lower limit signal and a binary value of an upper limit signal; the comparator circuit comprising:
- a plurality of first-level synthetic generate circuits each coupled to receive selected bits of said given signal and each generating a first-level synthetic generate signal;
- a plurality of first-level synthetic propagate circuits each coupled to receive selected bits of said given signal and each generating a first-level synthetic propagate signal; and
- a second-level synthetic generate and output circuit coupled to each of said first-level synthetic generate circuits and to each of said first-level synthetic propagate circuits, said second-level synthetic generate and output circuit including a first means for generating a second-level synthetic generate signal corresponding to said upper limit signal and a second means for generating a second-level synthetic generate signal corresponding to said lower limit signal;
- wherein said second level synthetic generate and output circuit further comprises a comparison result output line coupled to said first means for generating a second-level synthetic generate signal and to said second means for generating a second-level synthetic generate signal, and wherein said comparison result output line provides a comparison result output signal indicative of whether the binary value of said given signal is within said range; and
- wherein each of said first-level synthetic propagate circuits includes:
- a first set of transistors connected in series with respect to one another between ground and a synthetic propagate output line where said first-level synthetic propagate signal is provided; and
- a second set of transistors connected in series with respect to one another between a supply voltage terminal and said synthetic propagate output line.

* * * * *

UNITED STATES PATENT AND TRADEMARK OFFICE
CERTIFICATE OF CORRECTION

PATENT NO.    :    5,260,680
DATED         :    11/9/93
INVENTOR(S)   :    Kevin Glass It is certified that error appears in the above-identified patent and that said Letters Patent is hereby corrected as shown below:

Column 3 - line 55

Delete "bit-" and insert --bit--

Column 4 - line 15

Delete "H," and insert --H'--

Column 5 - line 13

Delete "H," and insert --H'--

Column 6 - line 35

Delete "5" and "The circuitry for...." should begin new paragraph.

UNITED STATES PATENT AND TRADEMARK OFFICE
CERTIFICATE OF CORRECTION

PATENT NO. : 5,260,680
DATED : November 9, 1993
INVENTOR(S) : Kevin Glass

It is certified that error appears in the above-indentified patent and that said Letters Patent is hereby corrected as shown below:

Column 7 - line 6

Delete "222" and insert --332--

Column 7 - line 19

Delete "S20" and insert --320--

Signed and Sealed this

Second Day of August, 1994

Attest:

BRUCE LEHMAN

Attesting Officer     Commissioner of Patents and Trademarks